July 16, 1940.    M. S. EVANS    2,208,251
WORK HOLDER
Filed Feb. 21, 1939    2 Sheets-Sheet 1
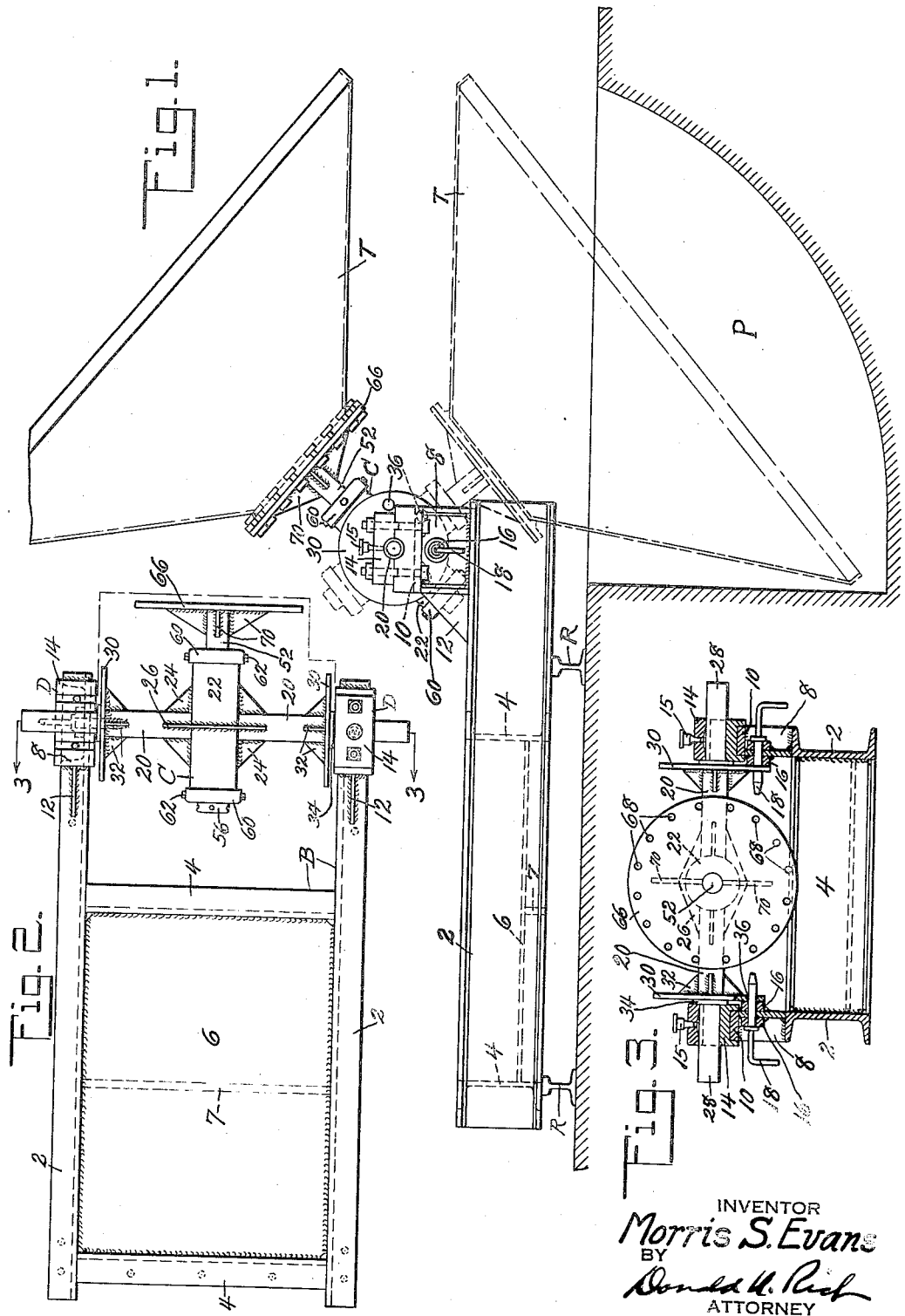
INVENTOR
Morris S. Evans
BY
Donald U. Rich
ATTORNEY

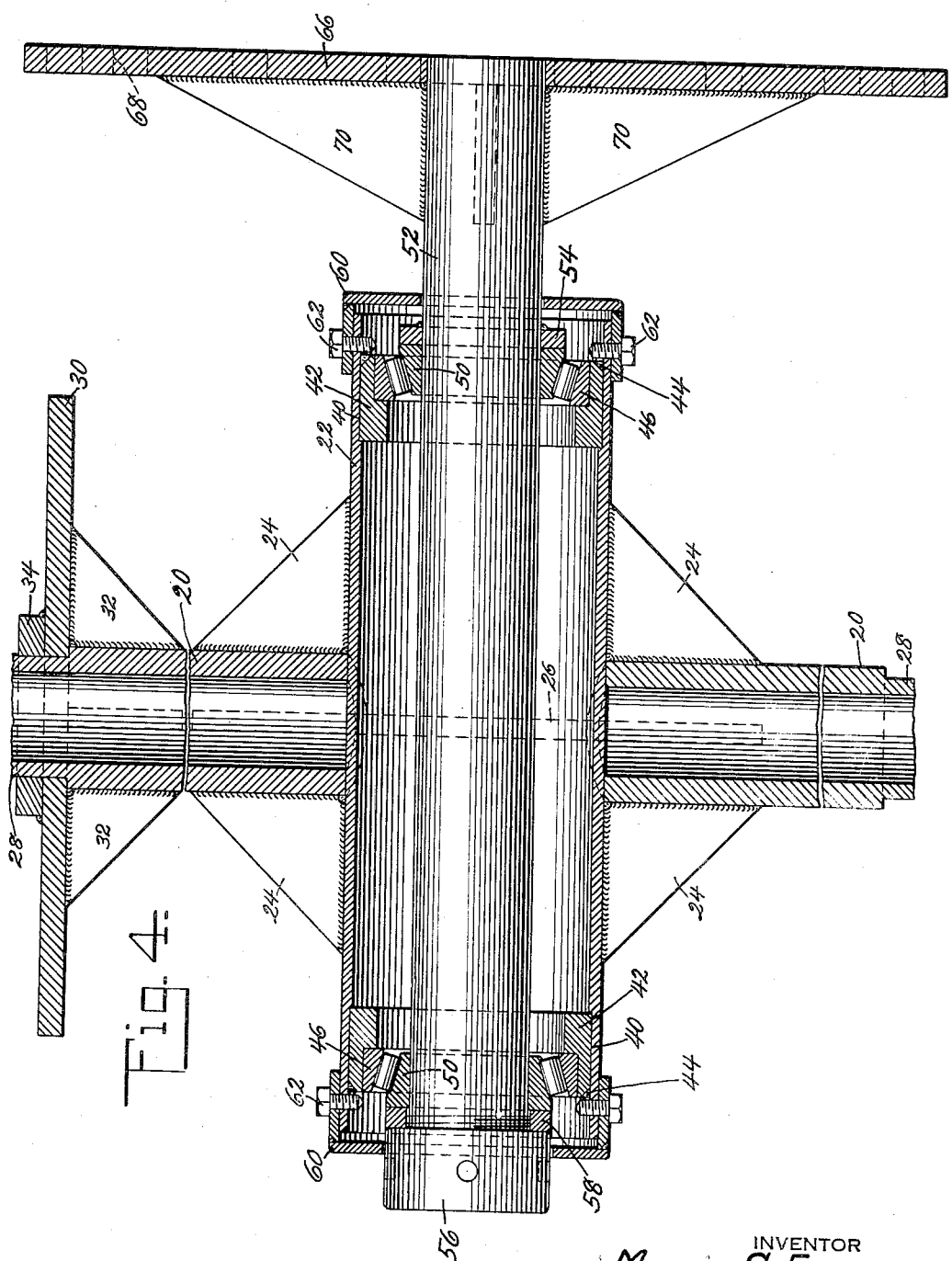

Patented July 16, 1940

2,208,251

UNITED STATES PATENT OFFICE 2,208,251

WORK HOLDER

Morris S. Evans, Berwick, Pa., assignor to American Car and Foundry Company, New York, N. Y., a corporation of New Jersey Application February 21, 1939, Serial No. 257,623

5 Claims. (Cl. 90—58)

This invention relates to work holders in general for use in welding processes and in particular to work holders for use in the welding of conical, circular or other substantially symmetrical objects.

In the past large conical, circular or other substantially symmetrical objects have been welded together by assembling the parts and welding the same together without moving the assembly, thus necessitating a large amount of awkward and impractical welding. It is an object, therefore, to provide a work holder to which the parts to be assembled may be attached and readily moved to place the welds in the most advantageous position.

A further object of the invention is the provision of a work holder to which the parts to be assembled may be attached and moved bodily to such positions as will permit substantially vertical application of welding metal to both surfaces of the assembled parts.

A still further object of the invention is the provision of a work holder upon which the assembled object to be welded may be secured and rotated to any position desired with a minimum effort on the part of the workman.

These and other objects of the invention will be apparent to persons skilled in the art from a study of the following description and accompanying drawings, in which:

Figure 1 is an elevational view showing the work holder with one form of object attached thereto;

Fig. 2 is a plan view of the work holder itself;

Fig. 3 is a sectional view taken substantially on line 3—3 of Fig. 2, and

Fig. 4 is an enlarged sectional view taken through the axes of the work holder.

Referring now to the drawings in detail, it will be seen that the work holder consists of a base B upon which is rotatably attached a work holding head assembly C. The base in the present instance is formed with side channels 2 connected together by cross channels 4 which are in turn connected together and to the side channels by a plate 6 reenforced as at 7 and providing a pan which may be filled with weights in order to retain the base in its proper position upon supporting structures such as rails R. In this manner the base may be made relatively light for movement from one place to another and yet be held firmly in position on the supporting structure in such a position that the work holding head assembly may overhang the pit P formed adjacent the supporting structure.

The side channels 2 are extended beyond the pan and carry adjacent their free ends bearing structures D. Each of the bearing structures is formed by welding short channels 8 to the side channels with the webs substantially in alignment with the side channel webs. Flat plates 10 are welded to the top of these short channels and the whole is reenforced and braced by triangular shaped gussets 12. Split bearings 14 are bolted to the flat plates and are provided with a conventional grease cup 15 by means of which lubricant may be fed to the bearing interior. Each of the short channels 8 has welded thereto small reenforcing rings 16 which, together with the channel web, are bored to receive locking pins 18, all as clearly shown in Figs. 1 and 3.

The work holding head assembly is preferably made by welding tubing 20 to either side and at right angles to the axis of a bearing tube 22 (Fig. 4). The junction between the tubing 20 and bearing tube 22 is strengthened and braced by means of four triangular shaped gussets 24 located preferably in the plane of the axes of the tubes and is also braced by two plates 26 (Fig. 2) located at right angles to the axis of the bearing tube but in the plane of the axes of the tubes 20. It is, of course, obvious that instead of using tubes 20, solid shafting would be equally useful. The tubes 20, or stub shafts, extend outwardly from the bearing tube and have their ends reduced as at 28, which reduced portion is finished in order that the stub shafts may have bearing in the split bearing blocks 14 previously referred to. The reduced portion of each stub shaft or tube 20 extends through circular plate 30 to which it is welded with the weld braced by means of four gusset members 32. Each circular plate 30 is reenforced adjacent the stub shaft by means of a thrust collar 34 welded to the plate and adapted to engage the inner face of the split bearing block, thus preventing any play of the assembly. Each of the plates 30 is provided with any suitable number of openings 36 (Figs. 1 and 3) adapted to receive locking pin 18 in order that the plate 30 and stub shafts 20 may be held in any desired position relative to the base. The bearing tube 22 has its ends machined interiorly thereof as at 40, thus providing a shoulder against which angle shaped bearing receiving members 42 may seat and be held in position by welding as at 44. Each of the angle shaped bearing receiving members provides a seat for outer race 46 of thrust bearings 48, the inner cone 50 of which is located upon shaft 52. The shaft 52 has welded thereto intermediate its ends a collar 54, while the end remote from the collar is threaded to receive adjusting nut 56 adapted to act on washer 58, thus permitting adjustment of the thrust bearings. The ends of the bearing tube are protected by means of caps 60 adapted to surround the shaft and be held in place on the tube by any suitable means, such as bolts 62. The shaft 52 has welded thereto at the end opposite from the adjusting nut a plate or table 66 provided with any desired number or arrangement of holes 68, by means of which the object to be welded, such as cone T, may be attached. The plate or table 66 is suitably braced and supported upon the shaft by means of any desired number of gusset braces 70. It is obvious that various supplemental attachments may be bolted or secured to the plate or table, which attachments will permit of ready reception and holding of various objects to be welded, but in the instance shown the conical tank head T has been shown as bolted directly to the plate or table.

From the preceding description it will be obvious that the work holder may be readily transported from one position to another in the shop and that when once in position it may be weighted down to prevent any tilting tendency due to the overhung weight of the object to be welded. In the operation of the work holder, assuming a conical tank head is to be welded as indicated in Figure 1, the tank head T will be attached to the plate or table and pins 18 inserted in such a position as to hold plates 30 locked to the base with the cone lowered in the pit P and with the upper outer surface of the cone substantially horizontal. In this position the work may be rotated in the thrust bearings upon shaft 52, thus permitting all seams to be brought to the upper horizontal position and permitting all welds on the exterior surface of the object to be made with the electrode in a substantially vertical position. After all exterior welds have been made pins 18 are removed, permitting the work holding head assembly to be rotated upon shafts 20 to the full line position of Figure 1, in which position it may again be held by inserting pins 18 through plates 30. With the work holding head assembly in this position the operator may make all interior welds by rotating the work upon the shaft 52 and with all welds being placed by the electrode being held substantially vertical. It will be obvious that by such an arrangement and operation of the work holder welding may be done with the greatest ease, efficiency and safety.

While the invention has been described more or less in detail, it will be obvious to persons skilled in the art that various modifications and rearrangements of parts may be made and all such modifications and rearrangements of parts are contemplated as will fall within the scope of the following claims:

What is claimed is:

1. In a pivotally mounted work holder of the character described, the combination of a base frame, bearings mounted on said base frame, shaft means mounted in said bearings for rotation to a plurality of positions, means for locking said shaft means in a plurality of rotated positions, a bearing tube rigidly connected to said shaft means with its axis substantially at right angles to the axis of said shaft means, thrust bearings in said bearing tube, and a shaft rotatably carried by said thrust bearings, said shaft being connected to a work holding table upon which articles to be welded may be secured.

2. In a pivotally mounted work holder of the character described, the combination of a base frame, bearings mounted on said base frame, stub shafts mounted in said bearings for rotation about a substantially horizontal axis to a plurality of positions, means for locking said stub shafts in a plurality of rotated positions, a bearing tube positioned between said stub shafts and rigidly connected thereto with its axis substantially at right angles to the axis of the shafts, reenforcing means joining said shafts and tube, and a work holding table rotatably carried by said bearing tube for rotation substantially on the axis of the tube.

3. In a pivotally mounted work holder of the character described, the combination of a base frame, bearings mounted on said base frame, stub shafts mounted in said bearings for rotation about a substantially horizontal axis to a plurality of positions, means for locking said stub shafts in a plurality of rotated positions, a bearing tube positioned between said stub shafts and rigidly connected thereto with its axis intersecting the axis of said stub shafts substantially at right angles, reenforcing means located substantially in the plane passing through said intersecting axes, and a work holding table rotatably carried by said bearing tube for rotation substantially about the axis of the tube.

4. In a pivotally mounted work holder of the character described, the combination of a base frame, bearings mounted on said base frame, stub shafts mounted in said bearings for rotation about a substantially horizontal axis to a plurality of positions, means for locking said stub shafts in a plurality of rotated positions, a bearing tube positioned between said stub shafts and rigidly connected thereto with its axis intersecting the axis of said stub shafts substantially at right angles, reenforcing means located substantially in the plane passing through said intersecting axes, additional reenforcing means positioned substantially in a plane through the axis of said stub shafts and at right angles to the axis of said bearing tube, and a work holding table rotatably carried by said bearing tube for rotation substantially about the axis of the tube.

5. In a pivotally mounted work holder of the character described, the combination of a base frame, bearings mounted on said base frame, stub shafts mounted in said bearings for rotation about a substantially horizontal axis to a plurality of positions, means for locking said stub shafts in a plurality of rotated positions, a bearing tube positioned between said stub shafts and rigidly connected thereto with its axis intersecting the axis of said stub shafts substantially at right angles, reenforcing means located substantially in the plane passing through said intersecting axes, additional reenforcing means positioned substantially in a plane through the axis of said stub shafts and at right angles to the axis of said bearing tube, thrust bearings carried by said tube adjacent either end thereof, and a shaft for a work holding table rotatably carried by said thrust bearings and being rigidly connected to a work holding table upon which articles to be welded may be secured.

MORRIS S. EVANS.